Figure 1:
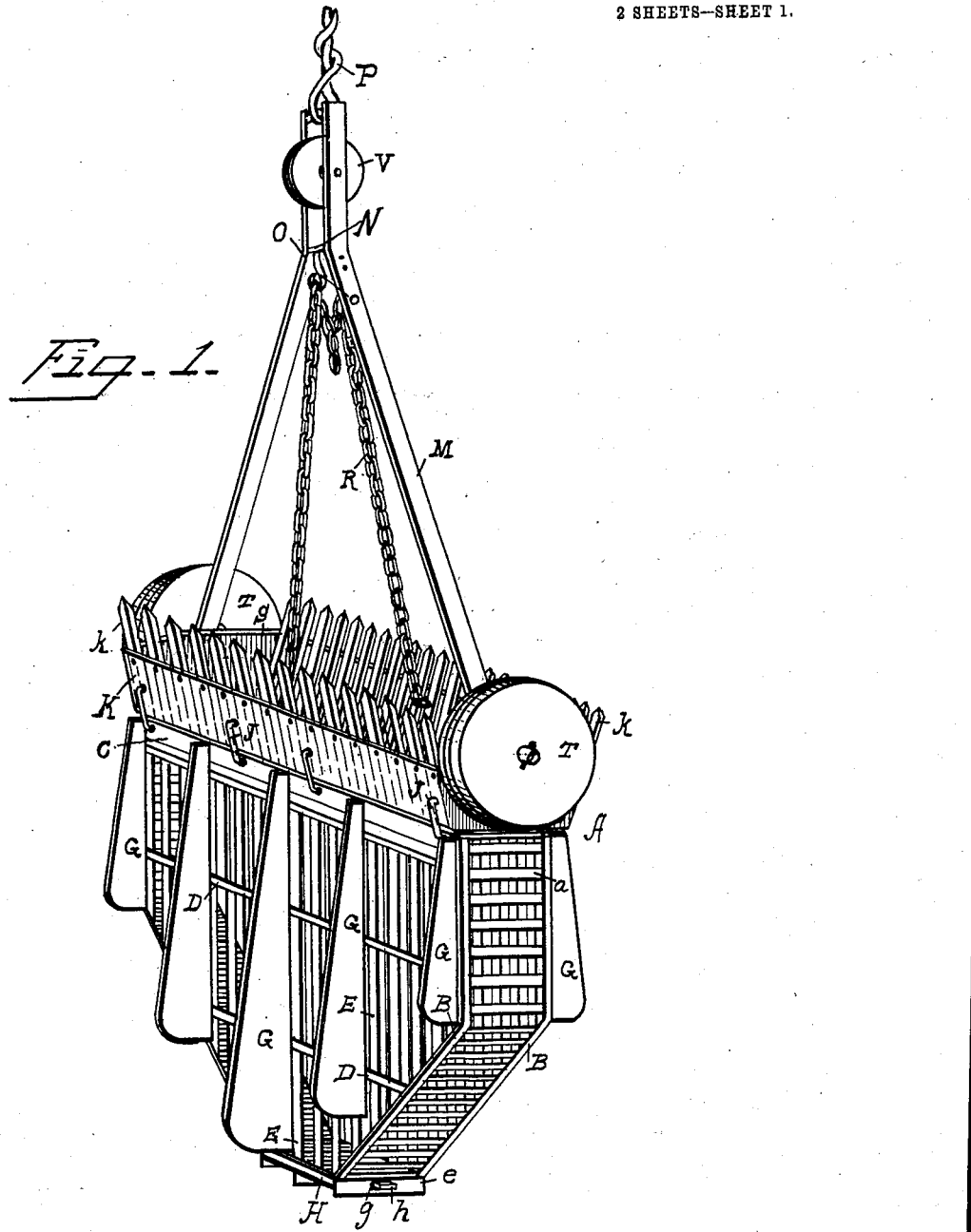

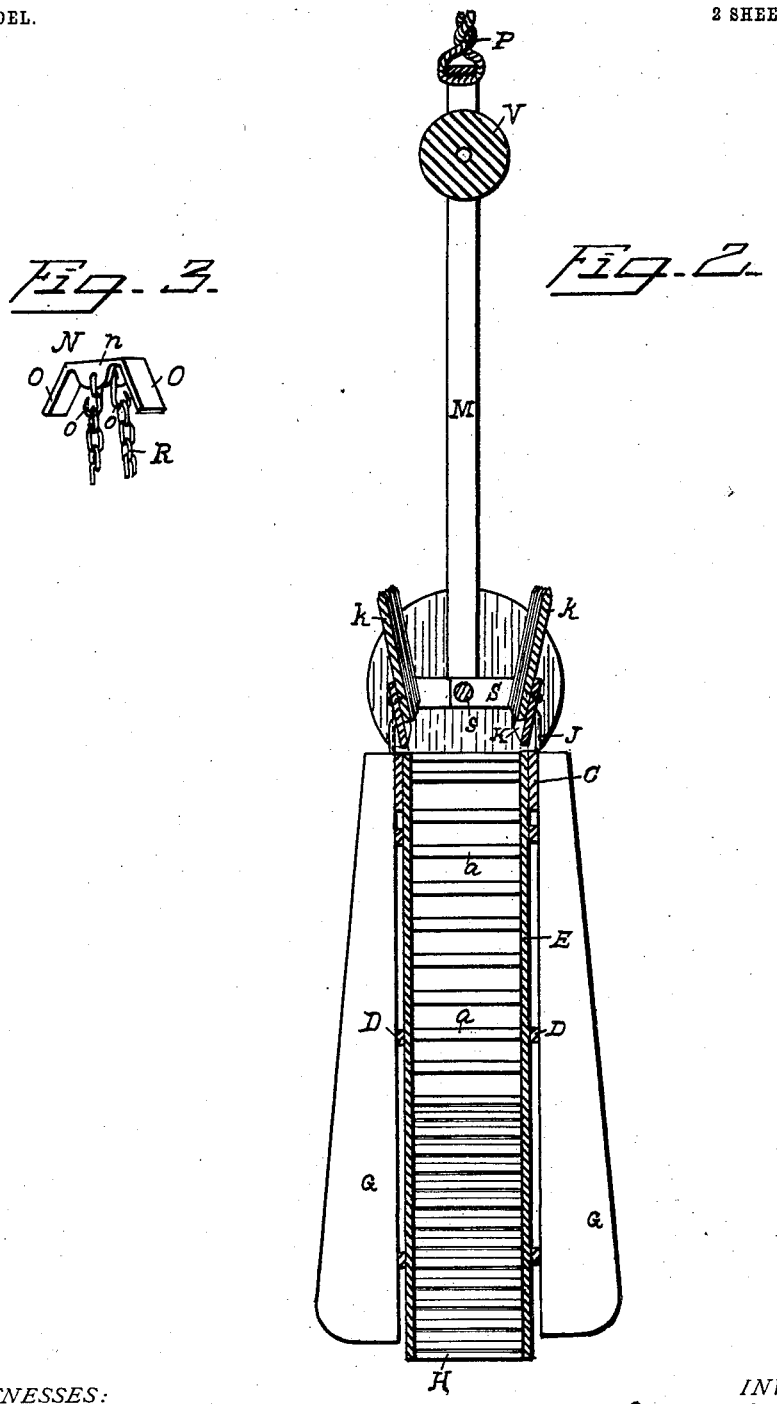

No. 734,571.

Patented July 28, 1903.

UNITED STATES PATENT OFFICE.

OSCAR F. KNAPP, OF DUBUQUE, IOWA.

MACHINE FOR COLLECTING SHELLS.

SPECIFICATION forming part of Letters Patent No. 734,571, dated July 28, 1903.

Application filed June 6, 1902. Serial No. 110,430. (No model.)

*To all whom it may concern:*

Be it known that I, OSCAR F. KNAPP, a citizen of the United States, residing in the city and county of Dubuque and State of Iowa, have invented certain new and useful Improvements in Machines for Collecting Shells; and I do hereby declare the following to be a full, clear, and exact description of the invention, which will enable others skilled in the art to which it appertains to make and use the same.

My device relates to machines for collecting shells, more especially clam-shells; and the leading object is to provide means for scooping up the shells, whether deposited in deep or shallow water, and, further, to separate the sediment and refuse from the shells and at the same time wash the shells while they are being collected and to facilitate and hasten the work of collecting.

It consists generally in a basket to which is hinged or loosely and adjustably attached a gathering-scoop adapted to be set at any desired angle and maintained at such angle.

It further consists in means secured to the basket for maintaining the basket somewhat above the surface of the bed of the shells to allow the sediment and refuse to pass out of the basket while the shells are being collected therein and at the same time to wash the shells and, further, in means for preventing the basket from becoming embedded in the mud or sand and permitting it to be drawn readily along the water-bed in which the shells are deposited, whether the bed be level or rough and uneven.

To acomplish these and other objects, I have set out in the following specification a preferably detailed mode of construction, which is to be considered in connection with the drawings accompanying the same and forming a part hereof.

Figure 1 shows a perspective view of my device; Fig. 2, a longitudinal section; Fig. 3, a perspective view of the block and double hook removed.

Like letters of reference denote similar parts in all the drawings.

Referring to the drawings, A designates the basket, which consists of a frame composed of bars B, set at any desired distance apart and united at the top by the plates C, one on each side. These bars B are connected together by numerous stays $a$. The sides of the basket are formed with stays D, which are rigidly connected with the bars B upon each side. To the stays D are attached the straps E, forming a network or meshes on both sides of the basket. For the purpose of preventing the basket from sinking into the sediment in the water-bed and also for the purpose of washing the shells and separating them from the sediment there are attached to the stays D upon the sides of the basket runners G, which preferably are widened at the lower end, extending the entire length of the basket, as shown in Fig. 1. At the bottom of the basket is hinged a gate H, to which is secured a spring-catch $h$, adapted to engage with the socket $g$ in the plate $e$, whereby the gate is locked to the bottom of the basket when in use and unlocked by withdrawing the catch from the plate E when the contents of the basket is to be dumped.

The scoop is formed by rigidly attaching to plates K the teeth $k$. These teeth upon one side are preferably set at an angle to the teeth upon the opposite side. The scoop thus formed is hinged or loosely attached to the plate C by the hinges J. It will be seen that the scoop by this mode of attachment to the basket is adapted to be tipped or turned on either side at an angle to the basket for the purposes presently to appear.

To the ends of the machine are pivoted hangers M, which converge toward each other near their outer ends and are united to a block N. This block is composed of a central portion $n$, with the plates O projecting at an angle to each other and the same angle as the hangers to which they are attached for the purposes presently to appear. To the portion $n$ are secured two hooks $o$, which project in opposite directions.

From the block N the hangers project upward parallel to each other and are united together at the top, forming a loop, to which is fastened a hoisting-rope P.

For the purpose of adjusting the scoop at a given angle and maintaining it in such adjusted position there is attached to the plate K two chains R, which extend upward and connect with the hooks o. In this manner when the scoop is turned at a given angle the chains are brought taut by engaging one link of each chain with the hooks o, which prevents any change in the angle of the scoop when set.

Between the ends of the hangers M, above the block N, is journaled a roller V, which serves to guide the hangers smoothly over obstructions in the water-bed and prevent them from plowing into the same, thereby regulating the depth of the hangers and preventing the basket from being unnecessarily disturbed by the irregularities in the surface of the oyster-bed.

The ends of the plate C are connected together by straps or stays S, and through these straps runs an axle s, and on the outer ends of the axle are journaled rollers T. These rollers could be journaled on trunnions which may be secured to the stays s; but I prefer to have a shaft run entirely through for the purpose of preventing large stone and other refuse from entering the basket, and this shaft may also serve as a connection for the hangers which are pivoted thereon, though they may obviously be pivoted to the stays S or to any other part of the machine. These rollers are a trifle more in diameter than the thickness of the basket and are adapted to roll along on the water-bed and with the roller V facilitate the operation of the machine and prevent it from being swamped or stuck in the water-bed and maintain it always at the best possible working position. From the description thus given it will be observed that the hangers, although capable of a swinging movement independently of the scoop, control the movements of the latter and the rollers T, when the flexible connections R are engaged with the hooks O and made taut, so that upon upward or downward movement of the hangers emanating from the irregularities of the water-bed the scoop is moved therewith. The hangers, roller V, rollers T, and scoop all moving in unison and aggrouped in this novel manner act to accomplish the results above set forth. Since the teeth of the scoop project beyond the periphery of the rollers T at a point between the roller V and the rollers T and as the rollers V prevent the hangers dipping into the water-bed, the dip of the scoop is regulated.

The mode of operating my device is substantially as follows: It will be understood that this device is attached by a long rope P to a cavel, bitts, or other part of a boat. The operator first adjusts the scoop at a desired angle and secures it in that position by engagement of the links of the chain R with the hooks o. He then lowers the collecting device into the water, which rests upon one side upon the water-bed, and then draws the machine along on the water-bed and scoops up the shells into the basket, and as the basket is raised up from the water-bed by the shoes G the sediment and refuse will pass between the meshes formed by the straps E and D; also, the shells will be thoroughly washed when the basket is drawn through the water. The rollers T will roll along upon the water-bed and facilitate the movement of the machine and prevent it from becoming embedded in the mud or sand and will, with the roller V and chains R, maintain the scoop at the desired angle to the basket. After the basket has been filled the operator raises it to a perpendicular above the water and then swings it around above the boat and by withdrawing the catch from the socket G allows the gate to swing down and dump the contents of the basket.

It will be understood that I do not wish to confine myself to this specific form of construction; but a wide range in detail may be adopted without departing from the spirit of my invention.

Having now described my invention, what I claim is—

1. In a machine for collecting shells, a basket, runners on said basket, a scoop provided with teeth, means for loosely attaching the scoop to the basket, hangers pivoted to the machine, and means for regulating the dip of the scoop including connections between the hangers and scoop.

2. In a machine for collecting shells, a basket, a dumping-gate attached to the basket, means for locking the gate, a scoop loosely attached to the basket, hangers pivoted to the machine and connection between the hangers and the scoop, whereby the scoop may be maintained at an angle to the basket, for the purposes shown.

3. In a machine for collecting shells, a basket, a scoop adjustably attached to the basket, hangers pivoted to the machine, and means for regulating the dip of the scoop including flexible connections between the hangers and scoop.

4. In a machine for collecting shells, a basket, a dumping-gate, runners upon the basket, a scoop adjustably attached to the basket, a shaft set in the opening of the scoop, rollers upon the shaft and means for drawing the device along on the water-bed, for the purposes shown.

5. In a machine for collecting shells, a basket, a dumping-gate, runners upon the basket, a scoop loosely attached to the basket, sustaining-rollers journaled at each end of the scoop, hangers pivoted to the machine, and means for regulating the dip of the scoop including adjustable connections between the scoop and hangers.

6. In a machine for collecting shells, a basket, a scoop provided with teeth upon its opposite edges, said teeth set at an angle to the basket, hinges for attaching the scoop to the basket, and means for holding the scoop in adjusted position consisting of hangers and connections between the scoop and the hangers, for the purposes shown.

7. A device for collecting shells, consisting of a basket, a dumping-gate, runners secured to the basket, a scoop loosely attached to the basket and provided with teeth, a shaft longitudinally set in the scoop, rollers upon the shaft, hangers connected to the machine, adjustable connections between the hangers and scoop, a roller secured in the outer end of the hangers, and means for drawing the device over the water-bed, substantially as and for the purposes shown.

8. A machine for collecting shells consisting of a reversible basket and a scoop hinged at the mouth of the basket on opposite sides thereof.

9. In a machine for collecting shells, a basket, a scoop provided with teeth, means for loosely attaching the scoop to the basket, hangers pivoted to the machine, and means for regulating the dip of the scoop including connections between the hangers and scoop.

10. In a machine for collecting shells, a reversible basket, a scoop loosely attached to the basket, hangers pivoted to the machine, and means for regulating the dip of the scoop.

11. In a machine for collecting shells, a reversible basket, a scoop loosely attached to the basket, hangers pivoted to the machine, and means for regulating the dip of the scoop including connections between the hangers and scoop.

12. In a machine for collecting shells, a reversible basket, a scoop loosely attached to the basket and provided with teeth upon its opposite edges, and means for adjustably regulating the angle of the scoop to the basket.

13. In a machine for collecting shells, a reversible basket, a scoop loosely attached to the mouth of the basket and pivoted with teeth on its opposite edges, hangers attached to the machine, and means for regulating the dip of the scoop including adjustable connections between the hangers and the scoop.

14. A machine for collecting shells provided with a basket, a scoop loosely connected with the basket, hangers pivoted to the machine, and connections between the hangers and scoop to maintain the latter at an angle to the basket.

In testimony whereof I have signed my name to this specification in the presence of two subscribing witnesses.

OSCAR F. KNAPP.

Witnesses:
L. WHITMORE,
H. H. WHITMORE.